US012637179B2

(12) United States Patent (10) Patent No.: US 12,637,179 B2
Viellard et al. (45) Date of Patent: May 26, 2026

(54) MOORING RENEWABLE ENERGY SYSTEMS

(71) Applicant: Acergy France SAS, Suresnes (FR)

(72) Inventors: Brice Helier Viellard, Boulogne-Billancourt (FR); Mathurin Michel Pierre Legrand, Paris (FR)

(73) Assignee: ACERGY FRANCE SAS, Suresnes (FR)

( * ) Notice: Subject to any disclaimer, the term of this patent is extended or adjusted under 35 U.S.C. 154(b) by 401 days.

(21) Appl. No.: 18/288,374

(22) PCT Filed: Apr. 21, 2022

(86) PCT No.: PCT/IB2022/000226
§ 371 (c)(1),
(2) Date: Oct. 25, 2023

(87) PCT Pub. No.: WO2022/229699
PCT Pub. Date: Nov. 3, 2022

(65) Prior Publication Data
US 2024/0383577 A1     Nov. 21, 2024

(30) Foreign Application Priority Data

Apr. 26, 2021     (GB) ..................................... 2105912

(51) Int. Cl.
B63B 21/50          (2006.01)
B63B 22/02          (2006.01)
(Continued)

(52) U.S. Cl.
CPC ............ B63B 21/508 (2013.01); B63B 21/50 (2013.01); B63B 22/026 (2013.01); B63B 35/44 (2013.01);
(Continued)

(58) Field of Classification Search
CPC . B63B 21/508; B63B 35/44; B63B 2035/446; B63B 21/50; B63B 22/026;
(Continued)

(56) References Cited

U.S. PATENT DOCUMENTS 4,280,238 A * 7/1981 van Heijst ............ B63B 22/021
441/21
5,054,415 A * 10/1991 Marshall .................. B63B 21/50
114/230.2
(Continued)

FOREIGN PATENT DOCUMENTS

CA          2915239 A1 * 6/2016 ............ B63B 21/50
CN      116146439 A * 5/2023 ............ F03D 17/00
(Continued)

OTHER PUBLICATIONS

International Search report of PCT/IB2022/000226 dated Sep. 19, 2022.
(Continued)

*Primary Examiner* — Brian Christopher Delrue
(74) *Attorney, Agent, or Firm* — MATTINGLY & MALUR, PC

(57)          ABSTRACT
A mooring system for a floating electric power producing unit such as a wind turbine or a wave energy converter comprises a buoyant element held beneath the surface and a swivel supported by the buoyant element. The swivel comprises a static part that is held against angular movement about an upright axis and a rotating part that is movable angularly relative to the static part about the upright axis. A mooring link extends between the power producing unit and a mooring point supported by the buoyant element. A conductor link extends between the power producing unit and a connector supported by the buoyant element. The mooring point and the conductor link are movable angularly about the upright axis together with the rotating part of the
(Continued)

swivel. Angular movement of the mooring link about the upright axis drives corresponding angular movement of the conductor link about the upright axis.

23 Claims, 4 Drawing Sheets

(51) Int. Cl.
    *B63B 35/44*        (2006.01)
    *F03D 13/25*        (2016.01)

(52) U.S. Cl.
    CPC ........ *F03D 13/25* (2016.05); *B63B 2021/501* (2013.01); *B63B 2035/446* (2013.01); *Y02E 10/727* (2013.01)

(58) Field of Classification Search
    CPC .. B63B 2021/501; Y02E 10/727; F03D 13/25
    See application file for complete search history.

(56)                    References Cited

U.S. PATENT DOCUMENTS

| | | | | |
|---|---|---|---|---|
| 5,288,253 | A  * | 2/1994 | Urdshals | B63B 22/023 |
| | | | | 114/230.26 |
| 8,657,534 | B2 * | 2/2014 | Jahnig | B63B 21/502 |
| | | | | 405/223.1 |
| 9,222,458 | B2 * | 12/2015 | Hart | F03B 13/18 |
| 10,336,404 | B2 * | 7/2019 | Dagher | F03D 3/005 |
| 12,479,536 | B2 * | 11/2025 | Chang | B63B 21/50 |
| 2011/0037264 | A1 * | 2/2011 | Roddier | B63B 39/03 |
| | | | | 290/55 |
| 2013/0272846 | A1 * | 10/2013 | Inoue | F03D 13/25 |
| | | | | 415/3.1 |
| 2014/0044541 | A1 * | 2/2014 | Dupin De La Gueriviere | ........... |
| | | | | F03D 17/00 |
| | | | | 416/85 |
| 2016/0230746 | A1 * | 8/2016 | Dagher | F03D 13/10 |
| 2016/0341182 | A1 * | 11/2016 | Dagher | B63B 21/502 |
| 2017/0166286 | A1 * | 6/2017 | Nakamura | B63B 21/20 |
| 2018/0149132 | A1 * | 5/2018 | Inoue | B63B 39/00 |
| 2021/0276673 | A1 * | 9/2021 | Boo | B63B 35/44 |
| 2021/0354788 | A1 * | 11/2021 | Remmers | B63B 21/50 |
| 2022/0119081 | A1 * | 4/2022 | Loeken | F03D 13/10 |
| 2022/0411025 | A1 * | 12/2022 | Chang | B63B 21/50 |
| 2023/0094823 | A1 * | 3/2023 | Bowie | B63B 21/508 |
| | | | | 114/294 |
| 2023/0159141 | A1 * | 5/2023 | Viselli | B63B 77/10 |
| | | | | 114/122 |
| 2023/0257075 | A1 * | 8/2023 | Skaare | B63B 21/20 |
| | | | | 114/230.2 |

FOREIGN PATENT DOCUMENTS

| | | | | |
|---|---|---|---|---|
| EP | 2993270 | A1 | 3/2016 | |
| EP | 3225835 | A1 * | 10/2017 | ............. F03D 13/20 |
| ES | 2440894 | A1 | 1/2014 | |
| GB | 1581325 | A  * | 12/1980 | .......... B63B 22/021 |
| GB | 2273087 | A | 6/1994 | |
| GB | 2564117 | A | 1/2019 | |
| WO | 2011/008834 | A2 | 1/2011 | |
| WO | WO-2011104413 | A1 * | 9/2011 | ............. B63B 22/04 |
| WO | 2012/066223 | A1 | 5/2012 | |
| WO | WO-2020127792 | A1 * | 6/2020 | ............. E02D 27/32 |

OTHER PUBLICATIONS

International Preliminary Report on Patentability dated Jul. 7, 2023.

* cited by examiner

MOORING RENEWABLE ENERGY SYSTEMS

This invention relates to moorings for offshore renewable energy systems, for use especially where such systems are located in water that is too deep to allow the use of alternative foundations. The invention particularly addresses the challenges of providing single-point mooring to buoyant equipment at or near to the surface, allowing motion of the buoyant equipment to be decoupled from a static base or foundation on the seabed.

Conventionally, mooring of buoyant equipment involves the use of multiple mooring lines each connected to an anchor on the seabed. Typically, a spread pattern of such lines radiating from the equipment in plan view resists lateral excursion of the equipment.

Reducing the number of mooring lines can of course simplify their installation and maintenance. Taken to the extreme, this approach leads to the well-known solution of a single-point mooring buoy, as exemplified by U.S. Pat. No. 4,280,238, in which a buoy is mounted at the top of a vertical column with a series of articulated joints allowing limited movement of the buoy relative to a base fixed to the seabed. The buoy thereby defines a single mooring point at the surface, providing a solution that is often used for offshore loading of oil and gas. However, as the buoy is at or near to the surface, it is exposed to risks of damage and fatigue due to the wind, waves and tides.

With the growing use of renewable energy systems in the marine environment, various mooring arrangements have been proposed for floating electric power production units such as offshore wind turbines and wave energy capture (WEC) systems. For example, WO 2012/066223 applies a single-point mooring concept to a floating wind turbine.

WO 2012/066223 makes various provisions to move a floating wind turbine laterally to a limited extent relative to the seabed. In some embodiments, a rigid link connects the wind turbine to an adjacent buoy at the surface. The upper part of the buoy, supporting the rigid link, can swivel around the vertical axis to enable movement of the wind turbine relative to the moored lower part of the buoy and hence relative to the seabed. In other embodiments, the buoy is integrated with the wind turbine and provision is made to move the buoy and the wind turbine together relative to the seabed.

The solutions proposed in WO 2012/066223 have various drawbacks. For example, the rigid link allows rotation but limits excursion of the floating wind turbine relative to the buoy both laterally within a horizontal plane and vertically, out of that plane. Also, in common with the prior art discussed previously, the buoy of WO 2012/066223 requires multiple mooring lines and is exposed to potentially damaging influences at the surface.

It can sometimes be desirable to allow moored buoyant equipment to move freely within a range relative to a single mooring point, in particular within a two-dimensional area or a three-dimensional volume that contains the mooring point. In GB 2273087, for example, an annular sub-surface buoy encircles and guides a flexible oil pipe that extends from the seabed to a tanker floating at the surface. The tanker is moored by a hawser attached to a swivelling part of the buoy.

Advantageously, the arrangement disclosed in GB 2273087 allows for rotation and for lateral and vertical excursion of the moored vessel while also mitigating the fatigue problem by virtue of the sub-surface location of the buoy. Again, however, the buoy is anchored to the seabed by multiple mooring lines. Also, the buoy is small, noting that it does not support much of the weight of the oil pipe but mainly guides the oil pipe whose weight is largely supported by the tanker. Thus, the buoy may not be sufficiently buoyant and stable to resist excessive lateral deflection under tension applied to the hawser mooring by lateral excursion of the tanker.

U.S. Pat. No. 5,288,253 also discloses a single-point mooring arrangement comprising a sub-surface buoy to which a tanker is moored for loading oil. Mooring lines extend from the tanker to a swivel on top of the buoy, whereby the moored tanker can turn or 'weathervane' around a vertical axis relative to the buoy. Conversely, the hose connecting the tanker to a subsea pipeline via the mooring extends through the swivel but cannot rotate relative to the mooring. Thus, a fluid swivel on the vessel counteracts twisting of the hose as the vessel weathervanes around the mooring.

Disadvantageously, therefore, U.S. Pat. No. 5,288,253 requires the vessel to be adapted to suit the mooring. Also, as the mooring lines are oriented at only a small angle to the horizontal, tension in the mooring lines applies high lateral forces to the buoy that tend to pull the buoy strongly away from the vertical as the vessel approaches its maximum excursion.

EP 3225835 discloses a floating wind turbine generator (WTG) that is moored to a buoy, itself anchored to the seabed by three mooring lines. The mooring line that connects the WTG to the buoy is connected to a swivel joint that is situated below the buoy. The system also comprises an electrically transmitted rotating means comprising a cable extending from the WTG and passing through the buoy and a swivel connector at the top of the buoy. ES 2440894 and EP 2993270 disclose similar arrangements, although in EP 2993270, the mooring link to the buoy from the WTG is rigid.

WO 2011/104413 discloses a similar arrangement to those discussed immediately above but relates instead to electrical power producing units located below the surface of the sea, rather than WTGs floating on the sea.

WO 2011/008834 relates to a riser assembly for transporting hydrocarbons from a wellhead to a production vessel located above the wellhead. A buoy provides upthrust to keep a riser under tension and substantially vertical. A mooring line extends down from the vessel to connect to a swivel, as does a flexible pipe, which provides a continuation of the flow path from the riser.

Finally, GB 2564117 relates to a subsea offloading system for transfer of crude oil to shuttle tankers.

Against this background, the invention provides a mooring system for a floating electric power producing unit. The system comprises: an upright tensile member extending between a sub-surface buoyant element and a foundation, the tensile member being held in tension by upthrust of the buoyant element; a swivel supported by the buoyant element, the swivel comprising a static part that is held to resist angular movement about an upright axis and a rotating part that is movable angularly relative to the static part about the upright axis; a mooring link extending between the power producing unit and a mooring point supported by the buoyant element; and a conductor link extending between the power producing unit and a connector supported by the buoyant element, wherein the mooring point is vertically separated across the height of the buoyant element from the point of connection between the conductor link and the connector. A vertical clearance may be defined in water between the top of the buoyant element and an underside of the power producing unit.

The mooring point and the conductor link are movable angularly about the upright axis together with the rotating part of the swivel. For example, angular movement of the rotating part of the swivel and the conductor link about the upright axis may be driven by angular movement of the mooring link and the mooring point about the upright axis.

The mooring link and/or the conductor link suitably hang in a catenary shape between the buoyant element and the power producing unit. The mooring point is preferably offset angularly from the conductor link about the upright axis.

There could be more than one conductor link, more than one mooring link, more than one mooring point and/or more than one power producing unit.

A lower end of the conductor link may be attached to the buoyant element or to the rotating part of the swivel. In either case, the lower end of the conductor link may be supported by an arm such as a gooseneck that extends radially from, and is movable angularly about, the upright axis. Similarly, the mooring point may be on the buoyant element or on the rotating part of the swivel.

The rotating part of the swivel may be fixed to the buoyant element. For example, the swivel may define an interface between the buoyant element and the tensile member that enables angular movement of the buoyant element relative to the tensile member about the upright axis. Conversely, the static part of the swivel may be fixed to the buoyant element, in which case the buoyant element and at least the top of the tensile member could be in fixed angular relation about the upright axis.

Where the static part of the swivel is fixed to the buoyant element, the swivel may be supported by the buoyant element at a level above an interface between the buoyant element and the tensile member, for example at an upper end of the buoyant element opposed to that interface.

Preferably, the buoyant element is upwardly elongate, comprising buoyancy extending upwardly toward an upper end of the buoyant element from the tensile member at a lower end of the buoyant element. The mooring point may be at or near to the lower end or the upper end of the buoyant element, or at an intermediate level along the buoyant element.

The buoyant element suitably comprises a central longitudinal spine supporting a series of modules that provide the buoyancy. Conveniently, the connector can be accommodated within the spine. More generally, the connector may extend downwardly from the conductor link to an export cable at the lower end of the buoyant element. An upper end of the export cable is suitably in fixed relation to an upper end of the tensile member.

The mooring point may be vertically separated from the point of connection between the conductor link and the connector by at least half the height of the buoyant element. The conductor link may suitably be joined to the connector at a level above the mooring point. Thus, the connector may extend from the upper end to the lower end of the buoyant element. Alternatively, the conductor link can join to the buoyant element at an intermediate level between the upper end and the lower end of the buoyant element, in which case the connector may extend from that intermediate level to the lower end of the buoyant element. The buoyancy of the buoyant element can extend above and/or below the intermediate level.

The connector may comprise a sinuous or coiled portion or a sliding link for enabling relative angular movement of adjoining parts of the connector in response to angular movement of the conductor link about the upright axis.

The inventive concept embraces an offshore electric power generation installation comprising at least one mooring system of the invention.

The inventive concept also extends to a corresponding method of mooring a floating electric power producing unit to a sub-surface buoyant element. The method comprises: controlling excursion of the power producing unit by use of a mooring link that extends between the power producing unit and a sub-surface mooring point; transmitting power via a conductor link that extends between the power producing unit and the buoyant element, wherein the mooring point is vertically separated across the height of the buoyant element from the point of connection between the conductor link and the buoyant element; and moving the mooring point and the conductor link angularly about an upright axis, the mooring point and the conductor link moving together with a rotating part of a swivel supported by the buoyant element.

Angular movement of the rotating part of the swivel and the conductor link about the upright axis may be driven by angular movement of the mooring link and the mooring point about the upright axis. The buoyant element may be turned about the upright axis with the rotating part of the swivel, for example relative to a subsea foundation. Alternatively, the rotating part of the swivel may be turned about the upright axis relative to the buoyant element.

In summary, therefore, the invention provides a mooring system that is intended to allow limited movement of a floating unit connected to a fixed seabed component. More specifically, the system comprises a floating unit or structure such as a surface buoy that can be used to generate renewable energy. The floating unit may float at or under the surface. The floating unit may use wind, waves, current, temperature variation, humidity variation or solar power as the primary energy source or may use any combination of any such energy sources.

The system further comprises: a fixed component on the seabed such as a foundation; a sub-surface buoyancy tank providing an uplift force or upthrust; and a tether system connecting the buoyancy tank to the fixed component and kept in tension by that upthrust. The tether system may comprise a wire, a chain, a synthetic line, a rigid or flexible pipe or an umbilical, or any combination of such elongate elements in series or in parallel.

The buoyancy tank allows the floating unit to rotate around it or rotates with the floating unit relative to the fixed component. Thus, a rotating system or swivel integrated with, attached to or connected to the buoyancy tank allows the floating unit to move around or with the buoyancy tank. The rotating system also provides for the floating unit to be connected to the fixed component through the other elements of the system in the manner of a chain. In this respect, one or more hold-back lines connect the subsea tank and/or the rotating system to the floating unit.

The system of the invention allows for a reduction of mooring line loads in offshore structures that support or are part of renewable energy systems, in comparison with conventional direct catenary-to-seabed mooring solutions.

Embodiments of the invention provide a single-point mooring system for equipment floating at the surface of an expanse of water, such as a floater of an offshore wind turbine or a wave energy converter. The system comprises a sub-surface positively-buoyant element and a swivel comprising a static part and a rotating part. The swivel is assembled with the sub-surface buoyant element. The rotating part can rotate around the vertical axis and comprises a connection for mooring lines of the floating equipment.

A tensioned member, which may comprise a mooring cable, a chain, a tendon or a rigid rod, anchors a lower point of the assembly of the swivel and the sub-surface buoyant element to a static anchor. The tensioned member may comprise only one taut mooring cable, chain or tendon. The static anchor may, for example, be a clump weight laid on the seabed, a suction anchor or another foundation embedded in the seabed, such as a pile foundation.

In some embodiments, the swivel is located at the bottom of the sub-surface buoyant element, the rotating part of the swivel is connected to the sub-surface buoyant element and the static part of the swivel is connected to the tensioned member. In other embodiments, the sub-surface buoyant element is connected directly to the tensioned member and the swivel is mounted to the sub-surface buoyant element, for example at the top or possibly at an intermediate level between the top and the bottom. The swivel may be rigidly connected to the sub-surface buoyant element or may tilt relative to the sub-surface buoyant element in the vertical plane.

The sub-surface buoyant element may be vertically elongate and may have a cylindrical shape. For example, the sub-surface buoyant element may have a length or height that is at least twice its width. An advantage of the elongate shape is increased stability and better self-uprighting of the buoyant element when it is connected to the tensioned member. The top of the buoyant element is preferably sufficiently below the surface, for example at least 30 m below the surface, to be decoupled mechanically from surface motion such as waves.

The sub-surface buoyant element may comprise at least one buoy and may comprise a series or stack of mechanically-interconnected buoys or modules. The or each buoy or module may be made of syntactic foam or may comprise one or more buoyancy tanks filled with a fluid less dense than water, such as kerosene or other light liquid, or a gas.

The single-point mooring system of the invention may also comprise a passage or other path for at least one functional line, which may comprise at least one electrical cable and/or at least one optical cable, extending between a lower point or level and an upper point or level of the buoyant element. The lower point may be static and may, for example, be at the top of the tensioned member. Conversely, the upper point may be mounted on a structure or support that can rotate with the swivel or with the sub-surface buoyant element. The lower point and/or the upper point may comprise a gooseneck or a bend limiter to control bending of the functional line.

Thus, the invention provides a mooring system for a floating electric power producing unit, the system comprising a buoyant element held beneath the surface and a swivel supported by the buoyant element. The swivel comprises a static part that is held against angular movement about an upright axis and a rotating part that is movable angularly relative to the static part about the upright axis.

A mooring link extends between the power producing unit and a mooring point supported by the buoyant element. A conductor link extends between the power producing unit and a connector supported by the buoyant element. The mooring point and the conductor link are movable angularly about the upright axis together with the rotating part of the swivel. Angular movement of the mooring link about the upright axis drives corresponding angular movement of the conductor link about the upright axis.]

In order that the invention may be more readily understood, reference will now be made, by way of example, to the accompanying drawings in which.

Figure 2:
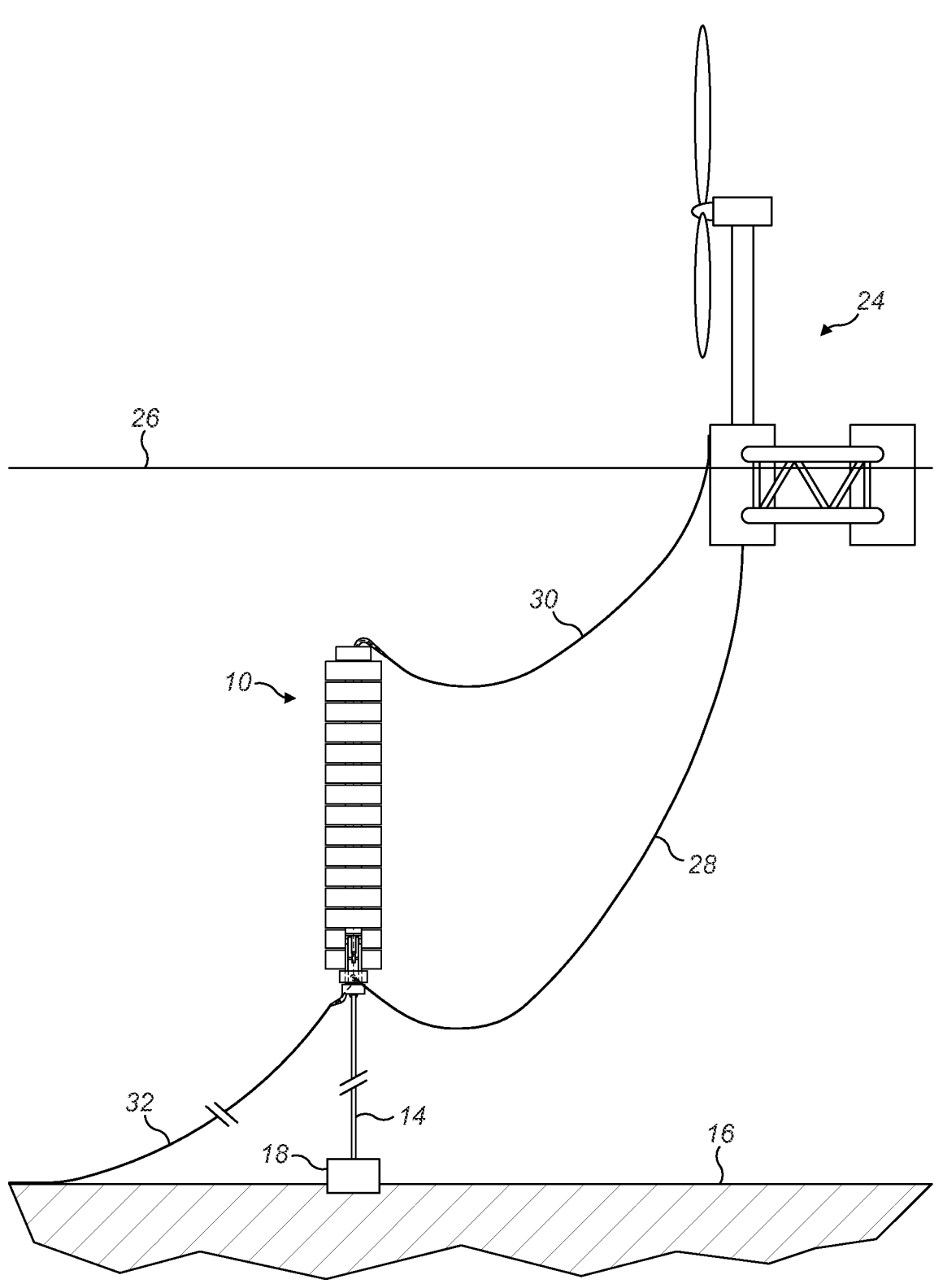
FIG. 2 is a schematic side view that shows the buoyant element of FIG. 1 as part of a mooring system for an offshore wind turbine.
Figure 4:
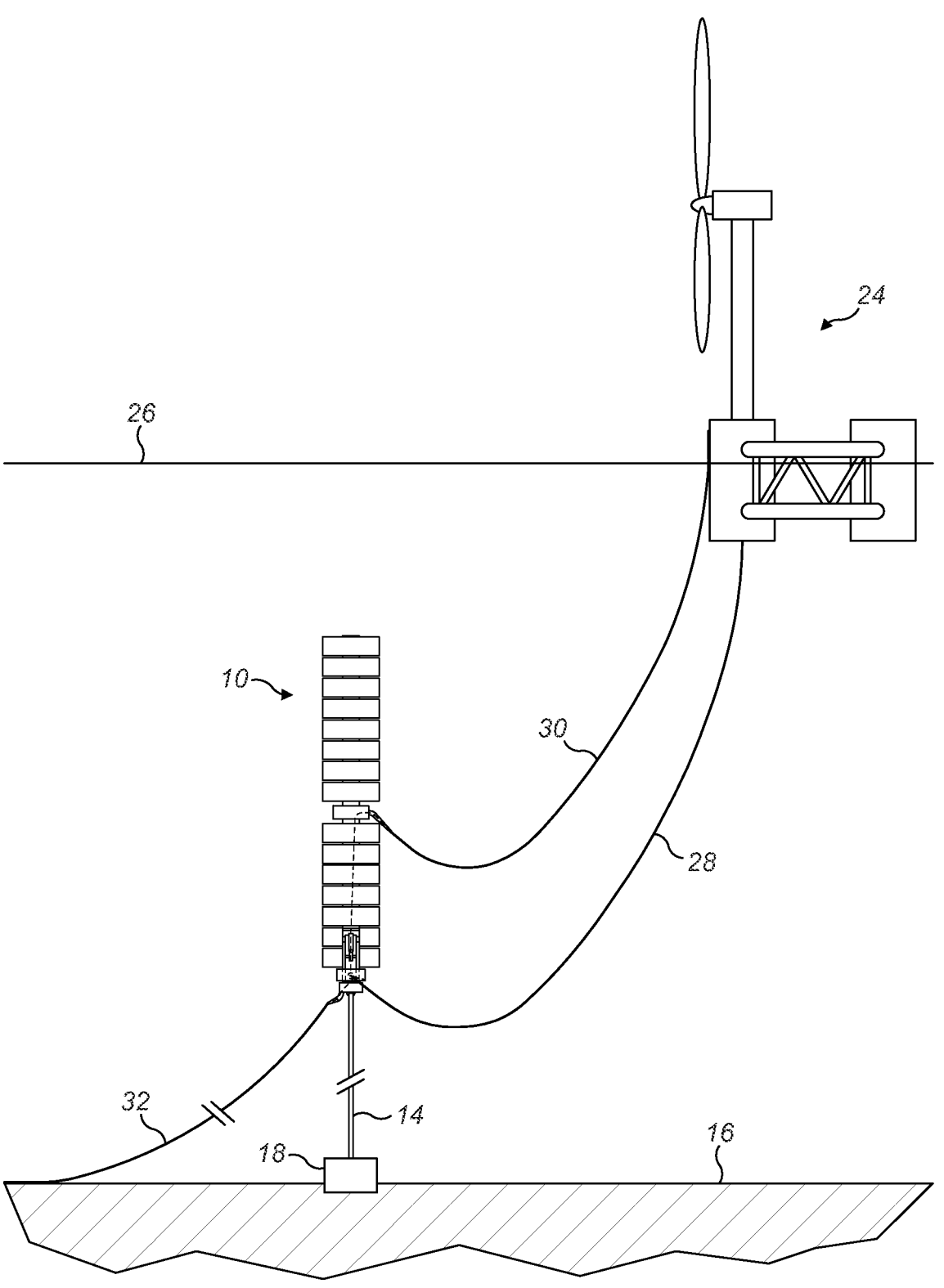
FIG. 4 corresponds to FIG. 2 but shows the buoyant element of FIG. 3.

Each of the drawings shows a buoyant element 10 of the invention, in these examples comprising an upright elongate cylinder that is rotationally symmetrical about a nominally vertical central longitudinal axis 12. The buoyant element 10 extends upwardly and coaxially from a tensile member in the form of a tether 14 that is anchored to the seabed 16 by a foundation 18 such as a clump weight or a suction pile, as shown in FIGS. 2, 4 and 6.

The upthrust of the buoyant element 10 keeps the tether 14 under tension and ensures that the buoyant element 10 and the tether 14 remain oriented on a substantially vertical common axis 12. However, in response to lateral loads, the tether 14 can flex or articulate to allow the tether 14 and/or the buoyant element 10 to depart from the vertical. Such flexing or articulation could also allow the longitudinal axis of the buoyant element 10 to deflect out of alignment with the longitudinal axis of the tether 14. Nevertheless, the buoyant element 10 and the tether 14 each remain oriented on an upright axis throughout.

The tether 14 is coupled to a lower end of the buoyant element 10, specifically to a tubular central spine 20 that extends along the full length of the buoyant element 10. In the examples shown, the spine 20 supports a stack of annular buoyancy modules 22 that each surround the spine 20. The buoyancy modules 22 may be made of syntactic foam or may be filled with a fluid, preferably an incompressible liquid, that is less dense than seawater.

The purpose of the buoyant element 10 is to provide a sub-surface single-point mooring for, and to support an electrical connection to, a floating electric power production unit 24. With reference to FIGS. 2, 4 and 6, the power production unit 24 is exemplified here by an offshore wind turbine floating at the surface 26. As noted previously, the power production unit 24 could take other forms, such as a wave energy converter. In some other forms, such as a tidal turbine, the power production unit 24 could float beneath the surface 26.

Mooring of the power production unit 24 to the buoyant element 10 is effected by a mooring link 28 that is exemplified here by one or more flexible catenary mooring lines such as chains or wires. The flexibility of the mooring link 28 allows the power production unit 24 to move within a range of excursion relative to the buoyant element 10. The range of excursion comprises an area of excursion in plan view, defined by radial and/or circumferential movement of the power production unit 24 across the surface 26 relative to the central longitudinal axis 12 of the buoyant element 10. The possibility of vertical movement of the power production unit 24 relative to the buoyant element 10, driven by waves and tides, extends the area of excursion into a three-dimensional volume of excursion.

It will be apparent that there is vertical clearance between the top of the buoyant element 10 and the bottom or draft of the power production unit 24. This clearance ensures that there will be no clash if the power production unit 24 drifts across the top of the buoyant element 10. The buoyant element 10 is also held at a depth beneath the surface 26 that minimises the risk of fatigue or damage due to surface effects such as storm-driven waves. For example, the top of the buoyant element 10 may be at a depth of thirty to fifty metres beneath the surface 26. The tether 14 can be of any length, potentially up to a few kilometres in length. This enables the power production unit 24 to be moored in deep water, indeed in much deeper water than more conventional foundations could allow.

Electrical connection of the power production unit 24 to the buoyant element 10 is effected by a conductor link 30 also extending from the buoyant element 10 to the power production unit 24. The conductor link 30 also hangs as a catenary to allow for movement of the power production unit 24 relative to the buoyant element 10 within the volume of excursion allowed by the mooring link 28.

In plan view, the conductor link 30 and the mooring link 28 may be substantially coincident on a common radius with respect to the central longitudinal axis 12 of the buoyant element 10. Conversely, in side view, the conductor link 30 and the mooring link 28 follow different paths and may be at substantially different levels or depths relative to the surface 26.

The conductor link 30 may also convey data between the buoyant element 10 and the power production unit 24 to serve as a data link, for example via optical fibres extending parallel to a power cable.

The buoyant element 10 is connected, in turn, to a subsea export cable 32 that conveys electrical power and optionally also data from the conductor link 30 to, for example, a remote substation or consumer, not shown. The export cable 32 emerges from the lower end of the buoyant element 10 beside the tether 14 and extends from there toward the seabed 16. The export cable 32 suitably hangs from the buoyant element 10 as a catenary, as shown, but could instead extend toward the seabed 16 along the tether 14. In other arrangements, the export cable could extend upwardly to a an installation at the surface 26.

The conductor link 30 emerges from the side or the top of the buoyant element 10, hence at a level substantially above the export cable 32. Conveniently, in this example, the conductor link 30 and the export cable 32 are connected by an internal elongate connector 34, shown here in dashed lines, that extends downwardly through the hollow spine 20 of the buoyant element 10 from the bottom end of the conductor link 30 to the top end of the export cable 32. The connector 34 conveys power and optionally also data through the buoyant element 10 between the conductor link 30 and the export cable 32.

In the examples shown, the conductor link 30 and the export cable 32 pass through respective goosenecks 36 or other bend limiters where they emerge from the buoyant element 10. Each gooseneck 36 extends downwardly and radially outwardly with respect to the central longitudinal axis 12 of the buoyant element 10.

As the production unit 24 moves circumferentially relative to the buoyant element 10, it is beneficial for the mooring link 28 and the conductor link 30 to swivel relative to the foundation 18 about the substantially vertical axis 12 defined by the tether 14. This freedom of movement reduces stress in, and avoids kinking of and damage to, the mooring link 28 and the conductor link 30. The embodiments shown in the drawings all have swivel arrangements mounted on or integrated with the buoyant element 10 but differ from each other in detail, as will now be described.

In the first and second embodiments shown in FIGS. 1 to 4 of the drawings, the swivel 38 is located at the bottom of the buoyant element 10 and at the top of the tether 14. Specifically, an inner part 40 of the swivel 38 is fixed relative to the tether 14 and an outer part 42 of the swivel 38 surrounding the inner part 40 is fixed to the buoyant element 10. The inner and outer parts 40, 42 of the swivel 38 are joined to each other by annular bearings 44 surrounding the inner part 40. Thus, the buoyant element 10 can turn about the vertical axis 12 relative to the tether 14, as the outer part 42 of the swivel 38 moves angularly relative to the fixed inner part 40.

The mooring link 28 is joined at its bottom end to a mooring point 46 at the lower end of the buoyant element 10. The mooring point 46 is in fixed angular relation to the buoyant element 10 and so also turns about the vertical axis 12 relative to the tether 14. This rotational movement is driven by angular displacement of the power production unit 24 and hence by a tangential or circumferential component of tension in the mooring link 28.

The bottom end of the conductor link 30 is also joined to the buoyant element 10 in fixed relation and so turns with the buoyant element 10 about the vertical axis 12 relative to the tether 14. In particular, the radially-outward extension of the gooseneck 36 defines a swinging arm that guides the conductor link 30 to turn with the buoyant element 10, to which the gooseneck 36 and the mooring point 46 are both fixed. It will be apparent that the mooring point 46 is offset orthogonally from the conductor link 30 about the vertical axis 12, whereby the mooring link 28 exerts torque that deflects the conductor link 30. Thus, rotational movement of the buoyant element 10 driven by angular displacement of the power production unit 24 correspondingly displaces the conductor link 30 about the vertical axis 12 to match the changing angular position of the power production unit 24. This reduces stress and fatigue in the conductor link 30 and its end fittings.

The export cable 32 is fixed relative to the top of the tether 14 and so is fixed relative to the fixed inner part 40 of the swivel 38. A coiled or sinuous portion 48 of the connector 34 allows for twisting of the connector 34 in response to angular displacement of the conductor link 30 relative to the export cable 32. A sliding connection such as a slip ring may also, or alternatively, be provided in the connector 34 to allow for uninterrupted transmission of power and data between adjoining parts of the transmission chain that can rotate to an unlimited extent relative to each other.

Figure 1:
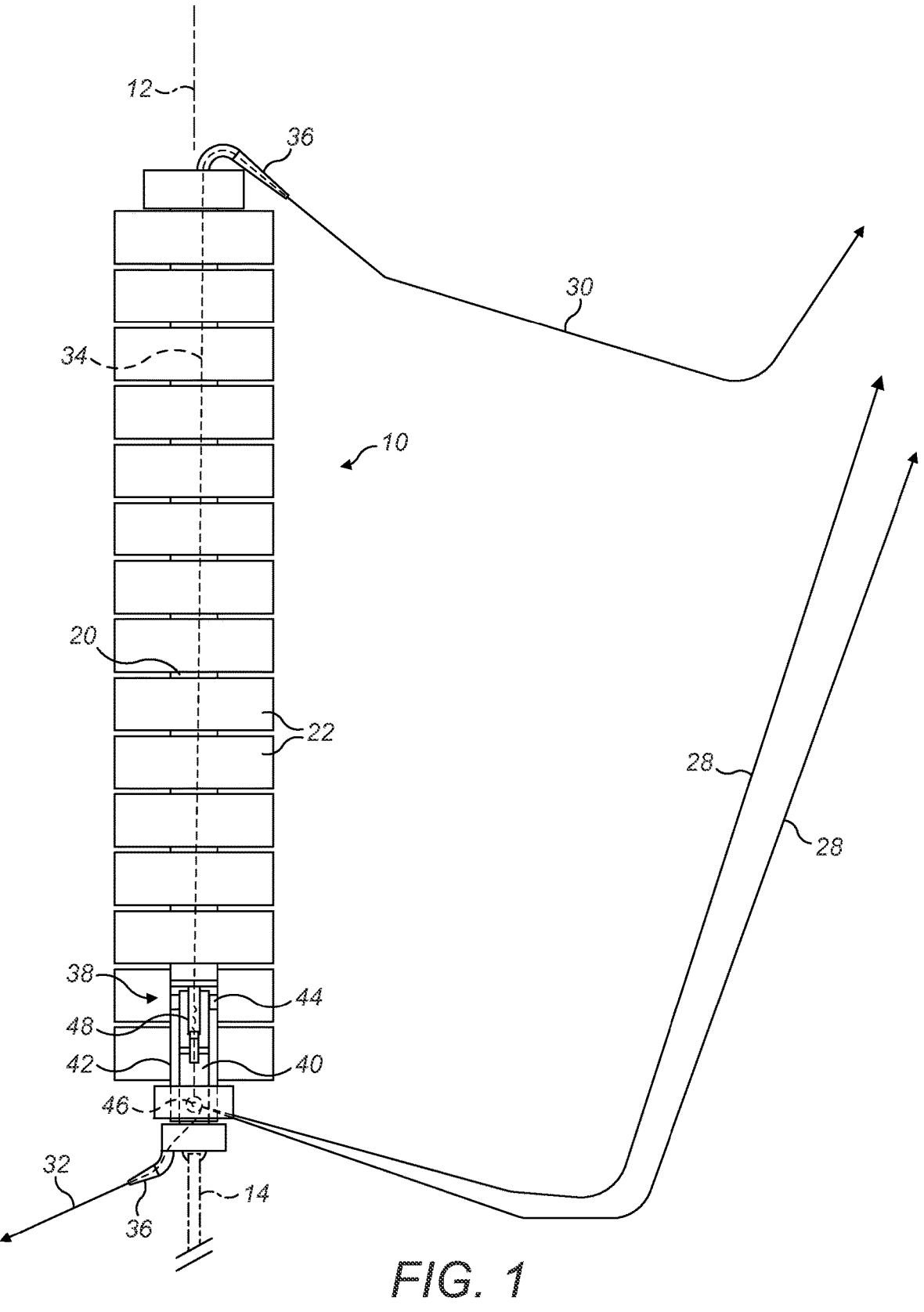
FIG. 1 is a side view of a buoyant element in a first embodiment of the invention.

In the first embodiment shown in FIGS. 1 and 2, the bottom end of the conductor link 30 is joined to the top of the buoyant element 10. Specifically, the gooseneck 36 around the bottom end of the conductor link 30 is supported by the top of the spine 20 of the buoyant element 10. Thus, the connector 34 that joins the conductor link 30 to the export cable 32 extends along the full height of the buoyant element 10.

Figure 3:
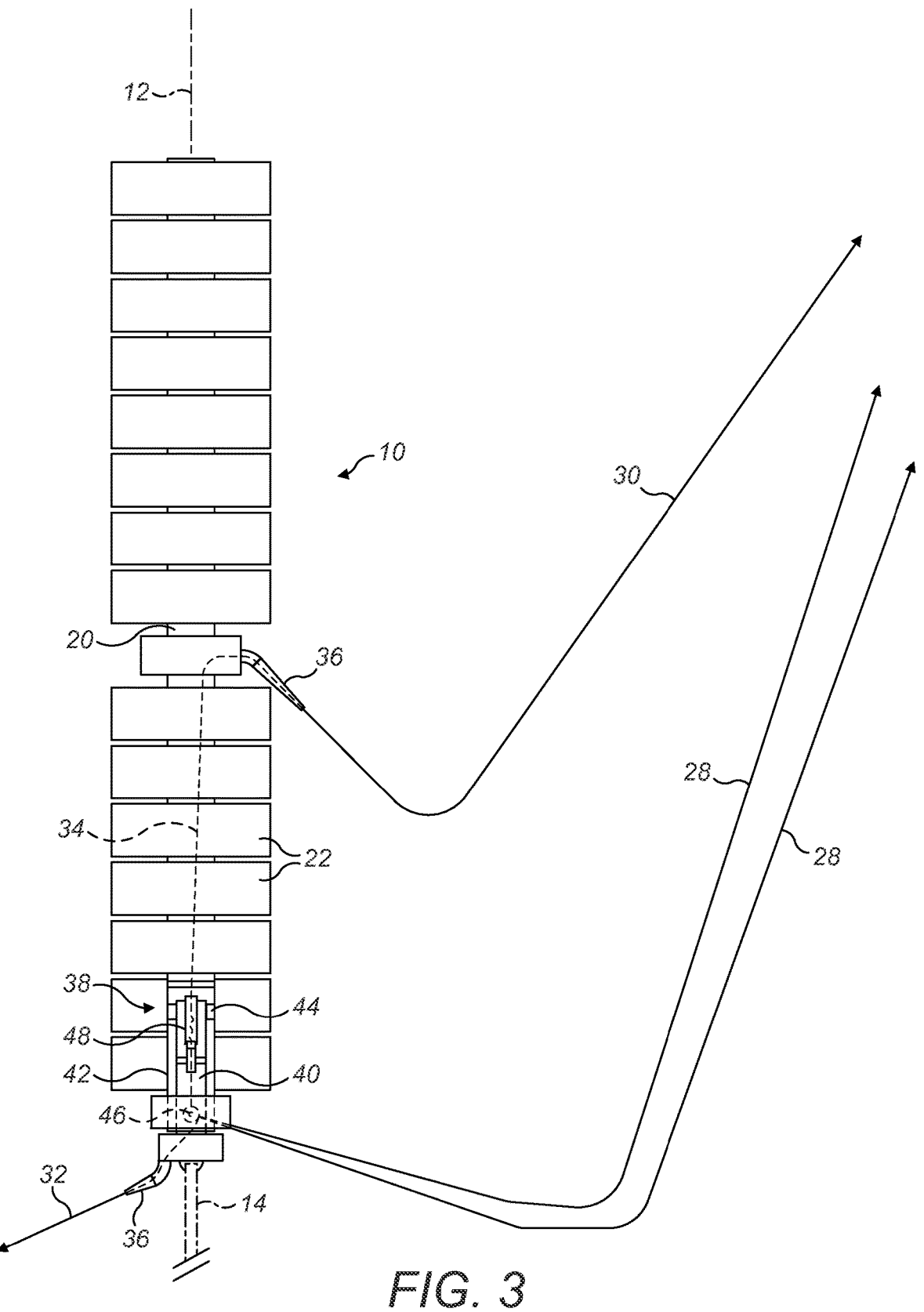
FIG. 3 is a side view of a buoyant element in a second embodiment of the invention.

In the second embodiment shown in FIGS. 3 and 4, the bottom end of the conductor link 30 is joined to the side of the buoyant element 10 at an intermediate level approximately mid-way between the top and the bottom of the buoyant element 10. Thus, the connector 34 that joins the conductor link 30 to the export cable 32 extends along about half of the height of the buoyant element 10, from the intermediate level to the bottom of the buoyant element 10. The stack of buoyancy modules 32 is interrupted by a central gap that accommodates the gooseneck 36 around the bottom end of the conductor link 30, which again is supported by the spine 20 of the buoyant element 10.

In the first and second embodiments, therefore, the bottom end of the conductor link 30 is at a level a substantial distance above the level of the mooring point 46, namely at least half of the height of the buoyant element 10. The first and second embodiments benefit from this vertical distance or offset between the mooring point 46 and the bottom end of the conductor link 30. In particular, stress in the mooring link 28 and lateral excursion or tilting of the buoyant element 10 under lateral loads is minimised. Also, the expensive conductor link 30 is usefully shortened and need not bear tensile loads even nearly as great as those borne by the mooring link 28.

Many variations are possible within the inventive concept. For example, there could be more than one tensile member, more than one conductor link, more than one mooring link and/or more than one mooring point. It is also possible, in principle, for more than one power producing unit to be moored to a single buoyant element.

The invention claimed is:

1. A mooring system for a floating electric power producing unit, the system comprising:

an upwardly elongate sub-surface buoyant element comprising a central longitudinal spine supporting a stack of modules providing buoyancy extending upwardly toward an upper end of the buoyant element from a lower end of the buoyant element;

a foundation;

an upright tensile member extending between the lower end of the buoyant element and the foundation, the tensile member being held in tension by upthrust of the buoyant element;

a swivel supported by the buoyant element, the swivel comprising a static part that is held to resist angular movement about an upright axis and a rotating part fixed to the buoyant element that is movable angularly relative to the static part about the upright axis;

a mooring point supported by, and in fixed angular relation to, the buoyant element;

a mooring link extending between the power producing unit and the mooring point;

a connector supported by the buoyant element; and a conductor link extending between the power producing unit and the connector, wherein the conductor link is in fixed angular relation to the buoyant element;

such that rotational movement about the upright axis of the mooring point, the buoyant element, the rotating part of the swivel and the conductor link are coupled, so that angular movement of the rotating part of the swivel and the conductor link about the upright axis is driven by angular movement of the mooring link and the mooring point about the upright axis, and wherein the mooring point is vertically separated across the height of the buoyant element from the point of connection between the conductor link and the connector.

2. The mooring system of claim 1, wherein a lower end of the conductor link is attached to the buoyant element.

3. The mooring system of claim 1, wherein a lower end of the conductor link is attached to the rotating part of the swivel.

4. The mooring system of claim 2, wherein the lower end of the conductor link is supported by an arm that extends radially from, and is movable angularly about, the upright axis.

5. The mooring system of claim 1, wherein the mooring point is on the buoyant element.

6. The mooring system of claim 1, wherein the mooring point is on the rotating part of the swivel.

7. The mooring system of claim 1, wherein the swivel defines an interface between the buoyant element and the tensile member and enables angular movement of the buoyant element relative to the tensile member about the upright axis.

8. The mooring system of claim 1, wherein the mooring point is at the lower end of the buoyant element.

9. The mooring system of claim 2, wherein the mooring point is at the upper end of the buoyant element.

10. The mooring system of claim 1, wherein the connector is accommodated within the spine.

11. The mooring system of claim 1, wherein the connector extends downwardly from the conductor link to an export cable at the lower end of the buoyant element.

12. The mooring system of claim 11, wherein an upper end of the export cable is in fixed relation to an upper end of the tensile member.

13. The mooring system of claim 1, wherein the connector extends from the upper end to the lower end of the buoyant element.

14. The mooring system of claim 1, wherein the conductor link joins to the buoyant element at an intermediate level between the upper end and the lower end of the buoyant element, and the connector extends from that intermediate level to the lower end of the buoyant element.

15. The mooring system of claim 14, wherein the buoyancy of the buoyant element extends above and below the intermediate level.

16. The mooring system of claim 1, wherein the connector comprises a sinuous or coiled portion or a sliding link for enabling relative angular movement of adjoining parts of the connector in response to angular movement of the conductor link about the upright axis.

17. The mooring system of claim 1, wherein the mooring point is vertically separated across the height of the buoyant element from the point of connection between the conductor link and the connector by at least half of the height of the buoyant element.

18. The mooring system of claim 1, wherein the conductor link is joined to the connector at a level above the mooring point.

19. The mooring system of claim 1, wherein a vertical clearance is defined in water between the buoyant element and an underside of the power producing unit.

20. The mooring system of claim 1, wherein the mooring link and/or the conductor link hang in a catenary shape between the buoyant element and the power producing unit.

21. The mooring system of claim 1, comprising more than one conductor link, more than one mooring link, more than one mooring point and/or more than one power producing unit.

22. The mooring system of claim 1, wherein the mooring point is offset angularly from the conductor link about the upright axis.

23. An offshore electric power generation installation comprising at least one mooring system as defined in claim 1.

\* \* \* \* \*